Figure 1:
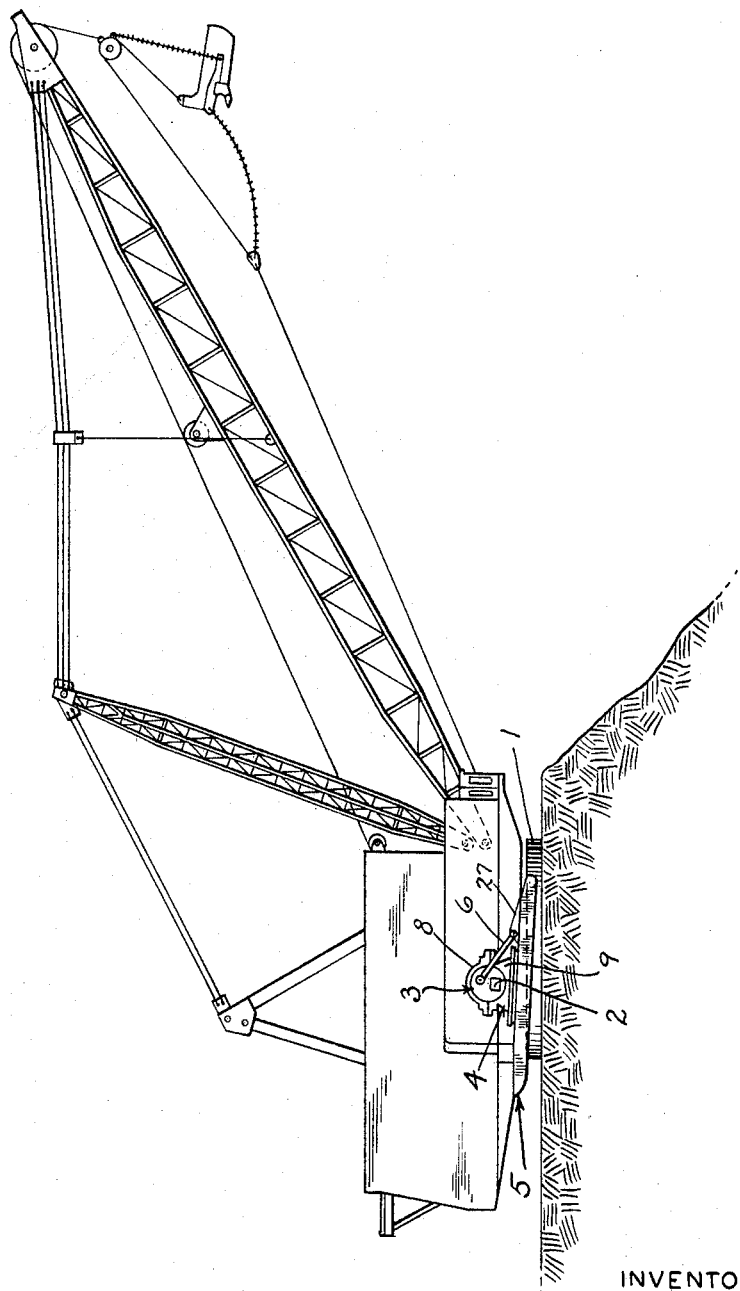

Aug. 9, 1966  H. C. BEITZEL  3,265,145
WALKING EQUIPMENT FOR DRAGLINE EXCAVATORS AND THE LIKE
Filed Aug. 20, 1964  5 Sheets-Sheet 1

INVENTOR
HORACE C. BEITZEL

BY *Allan W. Leiser*

ATTORNEY

Aug. 9, 1966 H. C. BEITZEL 3,265,145
WALKING EQUIPMENT FOR DRAGLINE EXCAVATORS AND THE LIKE
Filed Aug. 20, 1964 5 Sheets-Sheet 2
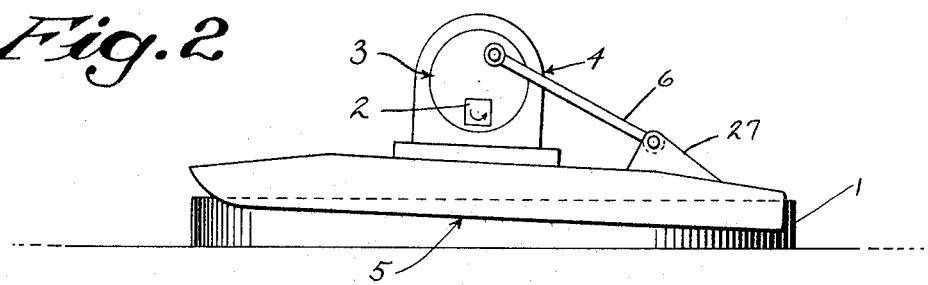
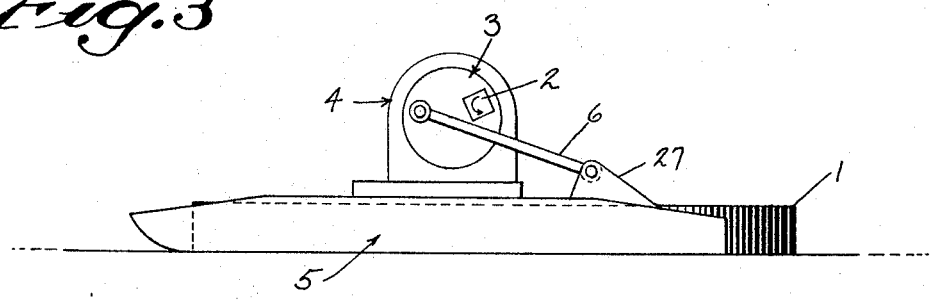
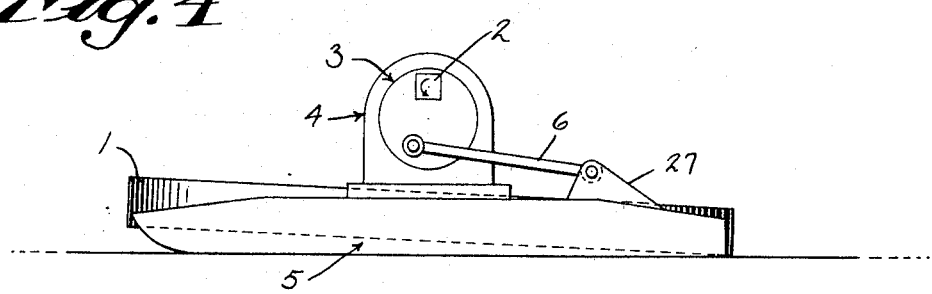
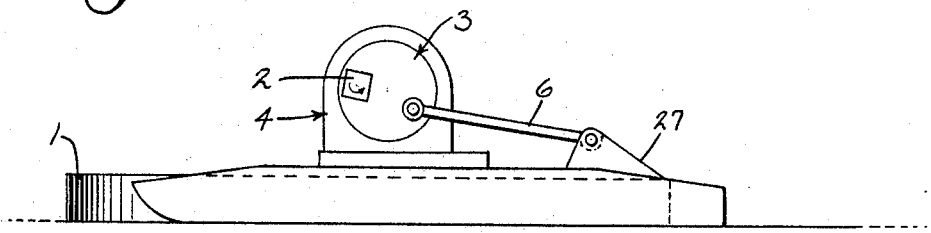
INVENTOR
HORACE C. BEITZEL
BY Allan W. Leiser
ATTORNEY

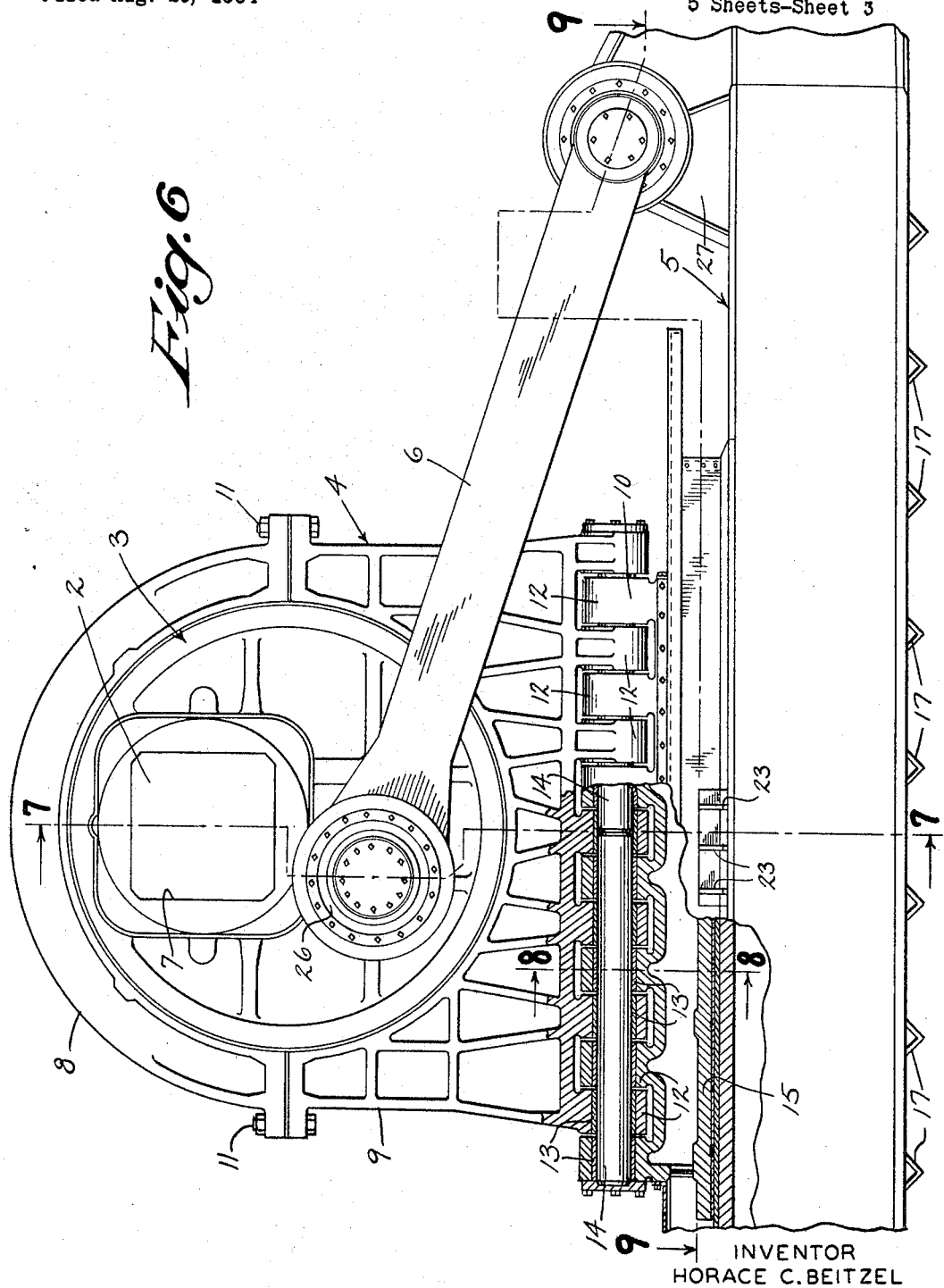

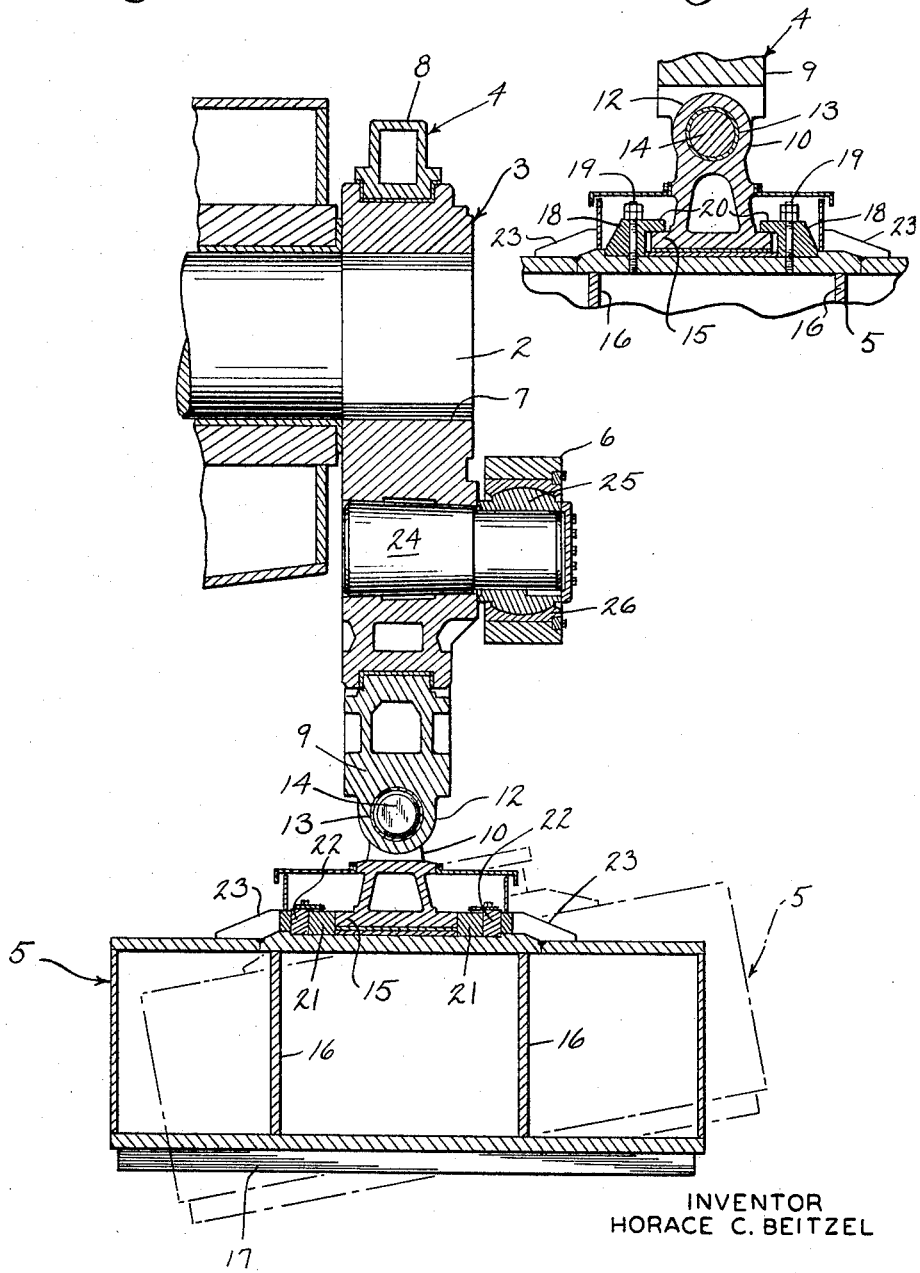

3,265,145
WALKING EQUIPMENT FOR DRAGLINE
EXCAVATORS AND THE LIKE
Horace C. Beitzel, South Milwaukee, Wis., assignor to Bucyrus-Erie Company, South Milwaukee, Wis., a corporation of Delaware
Filed Aug. 20, 1964, Ser. No. 390,839
12 Claims. (Cl. 180—8)

This invention relates to walking equipment for such devices as dragline excavators; and it resides more particularly in walking equipment including a generally circular, eccentrically rotatable driving member; a walking frame defining a generally circular bearing which rotatably receives the driving member to mount the frame thereon; a walking shoe slidably mounted on the frame; and a link connecting the shoe to the driving member.

This invention constitutes an improvement over earlier forms of walking equipment, for example the equipment shown in U.S. Patents Nos. 1,591,764 and 1,627,984, in which there is a frame member with an elongated or oval cam track and an eccentric cam which rotates and slides within the track to impart a walking action. Such earlier equipment is not satisfactory for extremely large equipment, for example large draglines which may have a working weight approaching nine million pounds. This is so because the contact between the cam and the frame when the machine is being lifted and dragged is essentially a line contact between a cylinder and a plane. This results in tremendous stresses along the line of contact. For example, for a dragline having a working weight of approximately six million pounds the pressure along the line of contact may approach one hundred and forty-five thousand pounds per square inch. To accommodate the proportionately greater pressures for even larger machines, the cam and frame would have to be made so large and cumbersome as to be impractical.

It is an object of this invention to provide walking equipment in which walking motion is imparted by means of a generally circular, disc-like driving member rotatably disposed within a generally circular bearing defined by a frame. This arrangement provides a relatively great area of contact between the disc and frame so that, for example, for a machine with a working weight of almost nine million pounds the pressure at the area of contact between the disc and the frame may be only two or three thousand pounds per square inch.

It is another object of this invention to provide walking equipment in which a walking shoe is slidably mounted on the walking frame and there is a link connecting the shoe and the driving member or disc so that rotation of the latter causes the shoe to move horizontally with respect to the frame. This arrangement increases the horizontal movement of the shoe in response to the rotation of the driving member over the motion imparted to the frame, thus providing a desirable long "step" while maintaining the structural advantages resulting from having a circular driving member and bearing. Further, the link can be located to bear and distribute to the shoe a portion of the vertical force exerted during a step, thus further reducing the pressure exerted on the frame bearing.

It is a further object of this invention to provide walking equipment in which there is a tapered slideway connecting the walking shoe and frame so that the shoe is centered before the beginning of each step, and in which the link connecting the shoe and driving disc is arranged so that the shoe is moving backward with respect to the frame as it contacts the ground, the shoe thus being freed from the slideway connection to be able to pivot slightly in a horizontal plane to compensate for uneven terrain.

It is still another object of this invention to provide walking equipment in which the link between the disc and walking shoe may be disconnected to provide more driving force, for example, if the machine is to climb a steep grade. This is also advantageous if the sliding connection between the shoe and frame should happen to become jammed since the walking equipment can still function, albeit with somewhat shorter steps.

It is a still further object of this invention to provide walking equipment in which there is a hinge connection operatively between the frame and shoe which allows the walking shoe to tilt to either side when, for example, the machine is walking on uneven terrain.

It is still another object of this invention to provide walking equipment in which the connections of the link to the disc and shoe are of a universal type to allow pivotal movement to accommodate for misalignment between the disc and shoe as a result, for example, of uneven terrain.

It is a still further object of this invention to provide walking equipment in which both the walking shoe and frame are moving backwardly at the time the shoe contacts the ground in a walking step.

It is still another object of this invention to provide walking equipment having all the foregoing advantages while being relatively simple and inexpensive to manufacture and assemble.

Other objects and advantages will appear from the description to follow. In the description, reference is made to the accompanying drawings, which form a part hereof, and in which there is shown, by way of illustration and not of limitation, a preferred embodiment of the invention.

Figure 9:
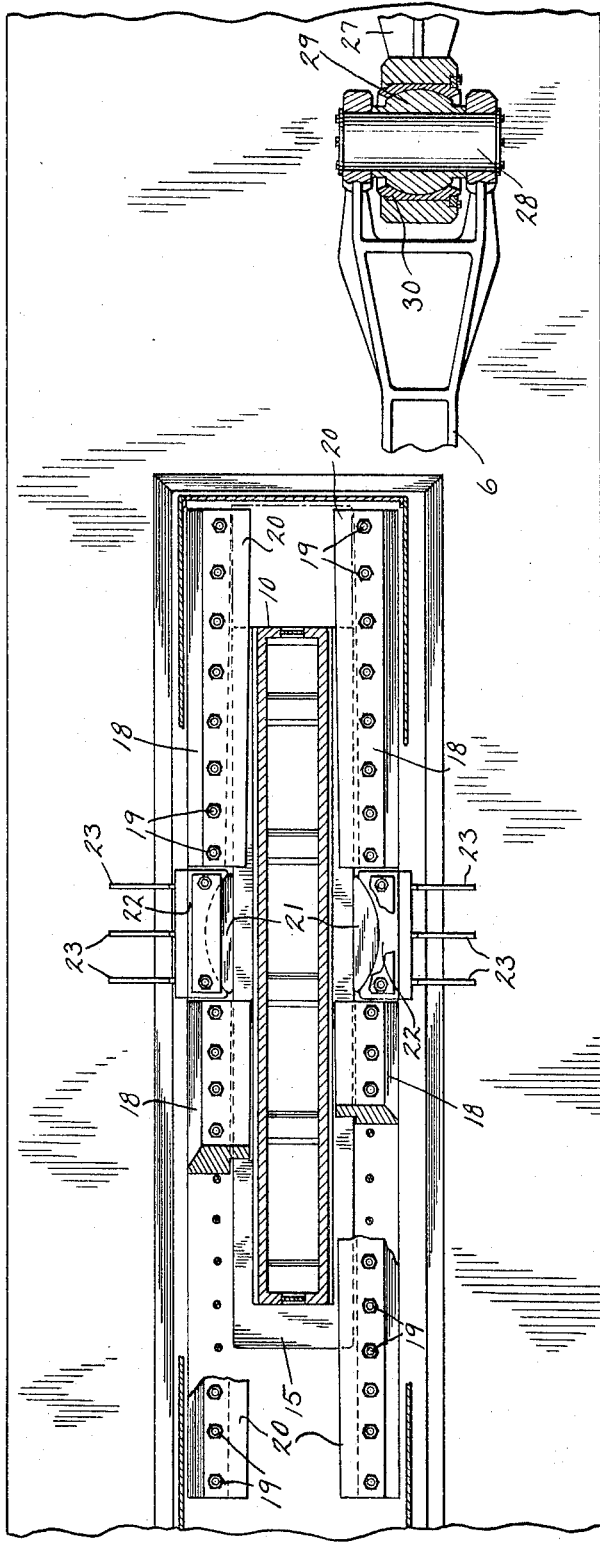

In the drawings:

FIG. 1 is a side view in elevation showing a dragline excavator provided with walking equipment constituting a preferred embodiment of the invention, FIGS. 2–5 are schematic sequence drawings illustrating the operation of the walking equipment of FIG. 1, FIG. 2 illustrating the equipment in a rest position, FIG. 3 illustrating the equipment at the beginning of a walking step, FIG. 4 illustrating the equipment at an intermediate position during a step, and FIG. 5 illustrating the equipment at the end of a step, FIG. 6 is an enlarged fragmentary side view, with parts shown broken away and in cross-section, of the walking equipment of FIG. 1, FIG. 7 is a fragmentary view in cross-section taken in the plane 7—7 shown in FIG. 6, with alternative positions of certain elements being shown in broken lines, FIG. 8 is a fragmentary view in cross-section taken in the plane 8—8 shown in FIG. 6, and FIG. 9 is a fragmentary view in cross-section, with parts shown broken away, taken in the plane 9—9 shown in FIG. 6.

The dragline excavator of FIG. 1 has been shown schematically and will not be described in detail since it is more or less conventional in form, and since walking equipment formed according to this invention may be used with other types of draglines, or for that matter with other types of excavating or other machines. Suffice it to say that the dragline is entirely rotatably mounted and supported by a large, circular base 1 when it is working. The walking equipment which will be described is mounted on and driven by a rotatable, horizontally disposed walking drive shaft 2 which is transverse to the intended direction of movement of the machine and has squared ends projecting outwardly on either side of the machine. The shaft 2 is driven by appropriate and well understood means (not shown) within the machine, such means being mounted above and operatively independent of the base 1 so that he shaft 2 and the walking equipment mounted thereon may pivot with the rest of the machine about the base 1.

Mounted on the ends of the shaft 2 on opposite sides of the dragline are two sets of walking equipment, each of which comprises, in general, a generally circular driving member or disc 3 eccentrically mounted on the shaft 2, a walking frame 4 rotatably receiving the disc 3 to be mounted thereon, a walking shoe 5 slidably mounted on the frame 4, and a link member 6 connected at its ends to the disc 3 and the shoe 5. The two sets of walking equipment on opposite sides of the machine are identical mirror images of each other, and operate simultaneously. Accordingly, only one set is shown and will be described in detail, and the structure and operation of the other will be apparent therefrom.

Referring now to FIGS. 6 and 7, the disc 3 is provided with a square shaft opening 7, offset from its center, which receives a square end of the shaft 2. The disc 3 is thus keyed to the shaft 2, their axes being parallel, and will rotate eccentrically about the shaft 2 as the latter rotates.

The frame 4 comprises three major parts, an upper portion 8, an intermediate portion 9 and a lower portion 10. The portions 8 and 9 are secured together by bolts 11. Each is provided with a semi-circular bushing portion so that they together define in the frame 4 a circular bearing which rotatably receives the disc 3 to mount the frame 4 on the disc 3. The disc 3 is appropriately flanged to prevent axial movement with respect to the frame 4. Because the disc 3 is eccentrically mounted, rotation of the shaft 2 will cause the frame 4 to move in a vertical circular path about the shaft 2, which path is in a plane transverse to the axes of the disc 3 and shaft 2.

The frame portions 9 and 10 are each provided with staggered hinge loops 12, each loop 12 being provided with a cylindrical bushing 13, which mate to form a continuous hinge connection between them. This connection is completed by a hinge pin comprising a pair of rod members 14 which together extend through the length of the hinge connection. The hinge connection allows the frame portion 10, and the shoe 5 which is mounted thereon as will be described, to pivot with respect to the frame portion 9, disc 3 and shaft 2 in a vertical plane generally parallel to the axis of the shaft 2, such pivotal movement being illustrated by the broken line showing in FIG. 7. It is the capacity for pivotal movement of the shoe 5 that is important as will be described, and the particular arrangement shown is not necessarily critical. It is important only that the hinge connection be operatively interposed between the shoe 5 and disc 3, the net result being that the shoe 5 can pivot with respect to the disc 3 and shaft 2.

The frame member 10 is provided at its bottom surface with sidewardly extending flanges, seen in FIGS. 7 and 9, to provide a generally rectangular, plate-like slide 15 at the bottom of the frame 4 that is transverse to the shaft 2 and parallel to the line of movement of the machine.

The walking shoe 5 is of a generally rectangular, hollow box-like configuration, provided with appropriate stiffener plates such as the plates 16 shown in FIG. 7, generally parallel to the slide 15. The bottom surface of the shoe 5 is provided with transverse tread members 17 to prevent slippage during walking.

As can be seen most clearly in FIG. 9, the upper surface of the shoe 5 is provided, generally on either side of its center line, with spaced sets of facing angle members 18 which are generally parallel to the length of the shoe 5. The members 18 are generally L-shaped and are secured at their bases to the shoe 5 by means of bolts 19 illustrated in FIG. 8. The other legs 20 of the members 18 overhang the slide 15 from opposite sides, also illustrated in FIG. 8. The two sets of members 18 thus form a slideway which mounts the shoe 5 on the frame 4 allowing it to be horizontally slidable with respect thereto, both forwardly and rearwardly with respect to the line of movement of the machine.

Between and separating the two sets of angle members 18 are a pair of identical thrust bearings 21 held in place by brackets 22 on opposite sides of the slide 15 with bearing surfaces against the slide 15. The bearings 21 serve to absorb side thrust occurring during a walking step. The bearings 21 and brackets 22 have mating, generally circular surfaces so that the bearings 21 are pivotable within the brackets 22 to allow for the pivotal movement of the shoe 5 provided for by a centering connection as will be discussed. Stiffening members 23 extend outwardly from each bracket 22 to the top surface of the shoe 5.

In FIG. 9 it can be seen that both sets of angle members 18 converge from left to right, so that there is a minimum clearance for the slide 15 therebetween when the slide 15 is to the right as seen in FIG. 9, which is the forwardmost position of the shoe 5, and a maximum clearance when the slide 15 is to the left, the rearwardmost position of the shoe 5. This tapered slideway arrangement serves as a centering connection and causes a centering action of the shoe 5 at one end of its travel, the beginning of a walking step, while allowing increasing clearance for horizontal angular movement during walking as will be described.

Referring now to FIGS. 6 and 7, it can be seen that the disc 3 is provided with an outwardly extending link pin 24 which is located generally opposite the center of the disc 3 from the shaft 2 and in FIG. 6 is approximately 30° to the left of a diameter through the center of the shaft 2. The left hand end of the link, 6 as seen in FIG. 6, is connected to the pin 24 by means of a disconnectable universal joint in the form of a ball joint comprising a ball member 25 mounted on the pin 24 and a socket member 26 held in a cage or loop formed at the end of the link 6. The link 6 may, therefore, pivot about the pin 24 in a plane parallel to the line of movement of the machine and is also allowed limited lateral and rotational movement.

As can be seen in FIGS. 6 and 9, the upper surface of the shoe 5 is provided with an upwardly extending mounting standard 27 to which the other end of the link 6 is connected by a second disconnectable universal joint in the form of another ball joint, comprising a pin 28 spanning a bifurcated end portion of the link 6, a ball member 29 on the pin 28, and a socket member 30 held in a cage formed in the standard 27. The lower end of the link 6 is thus capable of pivoting about the standard 27, also in a plane parallel to the line of movement of the machine, and is also allowed limited lateral and rotational movement.

The operation of the walking equipment of the invention may be understood with particular reference to FIGS. 2 through 5. In FIG. 2, the shaft 2, disc 3, frame 4, shoe 5 and link 6 are shown in what can be termed "rest" positions, the positions normally occupied when the dragline of FIG. 1 is working. That is, the shaft 2 is at the bottom of the bushing formed by the frame 4 so that the frame 4 is held by the disc 3 in an uppermost position. The shoe 5, which is attached to the frame 4, is thereby lifted off the ground, and the base 1 rests on the ground to support the machine. The shoe 5 is, in rest position, capable of pivoting about the disc 3, and suitable means (well known to the art and, therefore, not shown) should be provided to prevent or limit such movement unless the machine is walking.

When the machine is to be walked, the shaft 2 is rotated in counterclockwise fashion as seen in FIGS. 2 through 5, one complete revolution of the shaft 2 causing one complete step. In general, rotation of the shaft 2 causes the shoe 5 first to be moved downwardly and forwardly until it contacts the ground. Further rotation of the shaft 2 then causes the forward or leading end of the base 1 to be lifted off the ground and the machine is moved forward, or to the left, as seen in FIG. 4. Continued rotation causes the base 1 again to be lowered to the ground and the shoe 5 again to be raised to the position of FIG. 2.

In the first phase of a walking action, the various elements are moved to the positions of FIG. 3 wherein the shoe 5 has been moved forwardly and downwardly to rest on the ground beside the machine. This is effected in the preferred embodiment by rotating the shaft 2 through approximately 110°. As the shaft 2 rotates in this initial phase, the frame 4, through the disc 3, is first moved forwardly, in the intended direction of movement of the machine, and downwardly through a quarter circle until it reaches a position of maximum forward displacement when the shaft 2 has rotated through 90° and is at the level of the center of the disc 3. The maximum forward displacement of the frame 4 from the position of FIG. 2 is of course equal to the distance between the geometric center of the disc 3 and the center of the shaft 2. As the frame 4 moves forwardly in this manner, the shoe 5 is also advanced forwardly.

The maximum forward step afforded by movement of the frame 4 would be obtained by having the disc 3 at such a distance above the ground that the shoe 5 reaches ground level at the time when the shaft 2 has rotated through 90°. It has been found most advantageous, however, to have the disc 3 somewhat higher. This shortens the step somewhat, but also results in the shoe 5 being lifted higher in rest position to provide extra clearance. Accordingly, the dimensions of the various elements have been selected in the preferred embodiment so that when the shaft 2 is rotated 90° the shoe 5 is still slightly above the ground and does not reach ground level until the shaft has been rotated through approximately 110°.

The forward motion afforded by the disc 3 to the frame 4 and shoe 5 is increased, for the shoe 5, by the link connection 6. That is, as the shaft 2 rotates, the frame 4 moves along a path defined by the geometric center of the disc 3. The pin 24, however, moves through a circular path having a greater radius since it is disposed on the opposite side of the center of the disc 3 from the shaft 2. The link 6 connects the pin 24 to the shoe 5 so that this movement causes the shoe 5 to be moved forwardly further than the frame 4, the relative motion being allowed by the sliding connection between the walking shoe 5 and the angle members 18. As the shoe 5 moves with respect to the frame 4, the slide 15 moves to the right as seen in FIG. 9 so that it comes into contact with the spaced right hand ends of the two sets of converging angle members 18, and the shoe 5 is thus centered with respect to the frame 4 prior to the beginning of a walking step. This centering action insures that the two shoes 5 on opposite sides of the machine are parallel at the beginning of a walking step and that they are pointing in the desired direction of walking.

The placement of the pin 24 on the disc 3 is quite important. If the pin 28 on the shoe 5 were at the horizontal level of the center of the disc 3, the maximum additional displacement afforded by the link 6 would be obtained if the pin 24 were diametrically opposite the center of the shaft 2. Since the pin 28 is below the disc 3, however, maximum displacement is provided by having the pin 24 at a point generally opposite the shaft 2 but behind a diameter through the shaft 2. The actual point selected must be a compromise. For maximum forward displacement, the pin 24 should be located at a point which, when the shaft 2 has rotated through 90° and is at the level of the center of the disc 3, this being the point of maximum forward displacement of the frame 4, is directly in line with the shaft 2 and the pin 28. To provide for maximum rearward displacement the pin 24 would have to be moved; so that it, the shaft 2 and pin 28 are in line when the shaft 2 has rotated 270°. The location of the pin 24 for maximum displacement will also vary with the dimensions of the elements. Accordingly, a number of factors must be taken into account in selecting a location for the pin 24.

In the preferred embodiment of the invention, the pin 24 is located at a point somewhat in advance of the point which would afford maximum forward displacement of the shoe 5, being between this point of maximum forward displacement and a diameter through the shaft 2. This means that the shoe 5 will have completed its forward movement with respect to the frame 4 before the shoe 5 hits the ground and by the time the shoe 5 does hit the ground it will be moving rearwardly with respect to the frame 4. By virtue of this arrangement, the slide 15 is moved out of engagement with the tapered slideway formed by the converging angle members 18 by the time the shoe 5 contacts the ground, so that the shoe 5 is allowed limited lateral movement with respect to the frame 4 at the actual beginning of a step, and increasing lateral freedom as the step continues. This means that the shoe 5 will be able to pivot slightly to compensate for any irregularities in the ground. In the embodiment of the invention shown herein, the pin 24 is placed approximately 30° behind, to the right as seen in FIG. 2, of a diameter through the shaft 2 to provide the most desirable action.

When the shoe 5 contacts the ground it is also able to pivot with respect to the frame 4 by virtue of the hinge connection between the frame portions 9 and 10, thus allowing further compensation for any ground irregularities. The universal ball joint connections of the link 6 are important in that they accommodate the movements provided for by the hinge connection and the tapered slideway. The ball joints shown herein are each truly universal connections in that they allow for three degrees of movement, namely: vertical, pivotal movement about the pins 24 and 28; lateral movement; and rotational movement about the axis of the link 6. It is possible within the scope of the invention, however, to have other connections which would have the same net effect. That is, for example, the connection for the pin 28 could be of a universal type which does not allow for rotational movement if the connection for the pin 24 provides for such movement. Thus, the term "universal connection" is not intended to be limited to the strictly universal connections shown and covers any universal-type connection which, when both connections of the link 6 are considered together, provides for the required movements.

The next phase of a walking action comprises the further rotation of the shaft 2 through approximately 70° to bring it to the position of FIG. 4, which is approximately 180° from the position of FIG. 2. During this phase, the forward or leading edge of the base 1 is lifted from the ground and the base 1, with the excavator of FIG. 1, is moved forwardly or to the left as seen in FIG. 1, away from the boom end of the excavator. The shaft 2 is placed forwardly of the center of gravity of the excavator so that only the leading edge of the base 1 will be lifted and its rear edge will be dragged along the ground during a walking action, thus preventing the front or leading edge of the base 1 from digging into the ground or tipping during its movement.

During the phase of a walking action in which the excavator is lifted off the ground, the advantages of the circular disc 3 and the circular bearing in the frame 4 are extremely important. That is, since the disc 3 is received in the mating bushing of the frame 4 with a relatively close fit, the tremendous load upon the disc 3 and frame 4 is distributed over a relatively large area as opposed to the cylinder and plane contact of older types of walking equipment. With the circular disc 3 and circular bearing, maximum pressures of only two or three thousand pounds per square inch are generated even for a machine having a working weight approaching 9,000,000 pounds. The load on the frame 4 is further reduced by having the link 6 connected to the shoe 5 behind the frame 4. That is, as the shaft 2 rotates from the position of FIG. 3 to the position of FIG. 4 part of the force which would otherwise be exerted on the frame 4 acts through the link 6 on the shoe 5. The effect of increasing the step of the shoe 5 could be had by connecting the link 6 to the forward end of the shoe 5, but this would increase the load on the frame 4 rather than decreasing it.

Although the disc 3 shown herein is a full circle, it should be apparent that a part of the circle could be cut away so long as there is a substantial circular portion which will transmit the load when the base 1 is being supported. Such a disc would still be generally circular within the scope of the invention and the meaning of the appended claims.

As stated above, a walking action will be imparted to the shoe 5 by movement of the frame 4 about the disc 3, the link 6 serving simply to increase the movement of the shoe 5. This arrangement is advantageous in that should for any reason the shoe 5 become wedged or jammed to the frame 4 the link may simply be disconnected and the excavator will still be capable of walking, albeit with somewhat shortened steps. Also, the link 6 could be disconnected to provide more driving force if desired. Thus, one or both of the ball joint connections for the link 6 should be readily disconnectable. If desired, the link 6 can of course be disconnected at any time and the equipment will function, although the shoe 5 should then be appropriately pinned to the frame 4 to prevent sliding.

Further rotation of the shaft 2 from the position of FIG. 4 moves the various elements to the positions of FIG. 5, that is, the machine has been moved forwardly a full step and the base 1 has been lowered and is again resting on the ground.

From the position of FIG. 5, further rotation of the shaft 2 will cause the elements to move again to the positions of FIG. 2 or rest positions. Repeated rotations of the shaft 2 will of course cause repeated walking steps until the excavator has reached a desired position. The direction of movement of the excavator is controlled by the rotational position of the excavator, and the shaft 2, with respect to the base 1. The direction in which the shoes 5 point is controlled by the relative rotational position of the excavator with respect to the base 1. The direction of movement of the excavator can, then, be selected simply by rotating the excavator about the base 1 until the front end of the excavator, the end opposite the boom, is facing in the desired direction. Rotation of the shaft 2 will then cause the excavator to move in the selected direction.

Although a preferred embodiment of the invention has been shown and described herein, a number of variations may be possible without departure from the invention. It is not intended, therefore, that the invention be limited except insofar as such limitations appear in the following claims.

I claim:

1. In walking equipment, the combination comprising: a generally circular, eccentrically rotatable driving member; a walking frame having a generally circular bearing which rotatably receives the driving member to mount the frame thereon; a walking shoe mounted on the frame and longitudinally movable with respect thereto; and a connecting link pivotally connected at one end to the shoe and pivotally connected at its other end to the driving member.

2. In walking equipment, the combination comprising: a generally circular, eccentrically rotatable driving member having a drive shaft connection and a link pin; a walking frame having a generally circular bearing which rotatably receives the driving member to mount the frame thereon, rotation of the driving member about the drive shaft imparting to the frame a circular movement about the shaft in a plane transverse to the axis of the driving member; a walking shoe mounted on the frame to be capable of reciprocal movement with respect to the frame in a plane parallel to the plane of movement of the frame; and a connecting link pivotally connected at one end to the shoe and at its other end to the pin.

3. In walking equipment for dragline excavators and the like, the combination comprising: a generally circular, eccentrically rotatable driving disc; a walking frame having a generally circular bearing which rotatably receives the disc with a relatively close fit to mount the frame thereon; a walking shoe slidably mounted on the frame; a hinge connection operatively interposed between the shoe and disc to allow the shoe to pivot with respect to the disc in a plane generally parallel to the axis of the disc; and a connecting link having one of its ends pivotally connected to the shoe and its other end pivotally connected to the disc at a point generally opposite the center of the disc from the center of rotation of the disc.

4. In walking equipment for dragline excavators and the like, the combination comprising: a generally circular, eccentrically rotatable driving disc; a walking frame having a generally circular bearing which rotatably receives the disc with a relatively close fit to mount the frame thereon; a walking shoe slidably mounted on the frame to be capable of reciprocal sliding movement with respect to the frame, there being a centering connection between the shoe and frame so that the shoe is centered with respect to the frame at one end of its sliding movement and is capable of increasing rotational freedom in a horizontal plane with respect to the frame as it moves toward the other end of its movement; and a connecting link having one of its ends pivotally connected to the shoe and its other end pivotally connected to the disc at a point generally opposite the center of the disc from the center of rotation of the disc.

5. In walking equipment for dragline excavators and the like, the combination comprising: a drive shaft; a generally circular driving disc eccentrically mounted on and rotatable with the shaft; a walking frame defining a generally circular bearing which rotatably receives the disc with a relatively close fit to mount the frame thereon; a walking shoe that is reciprocably slidably mounted on the frame by means of a tapered slideway connection so that the shoe is centered with respect to the frame at one end of its movement and is capable of increasing lateral angular movement with respect to the frame as it slides toward the other end of its movement; a hinge connection operatively interposed between the shoe and disc so that the shoe is capable of pivotal movement with respect to the disc; and a link member having one of its ends connected by a universal connection to the shoe and its other end connected by a second universal connection to the disc at a point which is generally opposite the center of the disc from the shaft.

6. In walking equipment for dragline excavators and the like, the combination comprising: a horizontal, rotatable drive shaft transverse to the desired line of movement of the machine to be walked; a generally circular drive disc eccentrically mounted on and rotatable with the shaft with its axis generally parallel to the axis of the shaft; a walking frame defining a generally circular bearing which rotatably receives the disc with a relatively close fit, said frame including a lower portion below the disc which is connected to the remainder of the frame by a hinge connection which allows the lower portion to pivot in a plane generally parallel to the axis of the shaft; an elongated walking shoe that is slidably connected to the frame with a forward end pointing in the direction of movement of the machine, said walking shoe being slidable with respect to the frame forwardly and rearwardly along a line parallel to the line of movement of the machine; and a link member having one of its ends connected by a universal connection to the walking shoe and its other end connected by a second universal connection to the disc at a point which is generally opposite the axis of of the disc from the shaft.

7. In walking equipment for dragline excavators and the like, the combination comprising: a horizontal rotable drive shaft transverse to the desired line of movement of the machine to be walked; a generally circular driving disc eccentrically mounted on and rotatable with the shaft with its axis generally parallel to the axis of the shaft; a walking frame defining a generally circular bearing which rotatably receives the disc with a relatively close fit, said frame having laterally extending horizontal flanges to define at its bottom surface an elongated slide parallel to the line of movement of the machine; an elongated walking shoe that is generally parallel to and below the slide with a forward end pointing in the direction of movement of the machine, said walking shoe being provided on its upper surface on opposite sides of its center with two sets of facing angle members which overhang the slide to mount the walking shoe thereon, the walking shoe being slidable with respect to the frame forwardly and rearwardly along a line parallel to the line of movement of the machine, both sets of angle members converging in the same direction to center the walking shoe at one end of its travel with respect to the frame, there being increasing clearance between the slide and angle members as the walking shoe moves toward the other end of its travel; a hinge connection operatively interposed between the walking shoe and the disc so that the walking shoe is capable of pivoting in a plane generally parallel to the axis of the shaft; and a link member having one of its ends connected by a universal connection to the walking shoe and its other end connected by a second universal connection to the disc at a point which is generally opposite the axis of the disc from the shaft.

8. The combination of claim 7 wherein there is a pair of thrust bearings on opposite sides of the slide and between the sets of angle members and a bracket for each thrust bearing, the thrust bearings having bearing surfaces against the slide, the thrust bearings and brackets having mating, generally circular surfaces so that the bearings can pivot within the brackets in a horizontal plane.

9. In walking equipment for dragline excavators and the like, the combination comprising: a horizontal, rotatable drive shaft transverse to the desired line of movement of the machine to be walked; a generally circular driving disc eccentrically mounted on and rotatable with the shaft with its axis generally parallel to the axis of the shaft; a walking frame defining a generally circular bearing which rotatably receives the disc with a relatively close fit, said frame having laterally extending horizontal flanges to define at its bottom surface an elongated slide parallel to the line of movement of the machine; an elongated walking shoe that is generally parallel to and below the slide with a forward end pointing in the direction of movement of the machine, said walking shoe being provided on its upper surface on opposite sides of its center with two sets of facing angle members which overhang the slide to mount the walking shoe thereon, the walking shoe being slidable with respect to the frame forwardly and rearwardly along a line parallel to the line of movement of the machine, both sets of angle members converging from the front of the shoe toward the rear to center the walking shoe as it moves forwardly with respect to the frame, there being substantial clearance between the slide and angle members as the walking shoe moves rearward from its forwardmost position; a hinge connection operatively interposed between the walking shoe and the disc so that the walking shoe is capable of pivoting in a plane generally parallel to the axis of the shaft; and a link member having one of its ends connected by a universal joint to the walking shoe and its other end connected by a universal joint to the disc at a point which is generally opposite the axis of the disc from the shaft and is located between a diameter through the shaft and a point which, when the shaft is level with and to the rear of the axis of the disc, is in a straight line with the shaft and the point where the link is connected to the walking shoe.

10. In walking equipment for dragline excavators and the like, the combination comprising: a horizontal, rotatable drive shaft transverse to the desired line of movement of the machine to be walked; a generally circular driving disc eccentrically mounted on and rotatable with the shaft with its axis generally parallel to the axis of the shaft; a walking frame defining a generally circular bearing which rotatably receives the disc with a relatively close fit; an elongated walking shoe slidably connected to the frame that is generally parallel to the line of movement of the machine, the walking shoe being slidable with respect to the frame forwardly and rearwardly along a line parallel to the line of movement of the machine; and a link member having one of its ends connected by a universal joint to the walking shoe at a point to the rear of the disc and its other end connected by a universal joint to the disc at a point which is opposite the axis of the disc from the shaft and is located between a diameter through the shaft and a point which, when the shaft is level with and to the rear of the axis of the disc, is in a straight line with the shaft and the point where the link is connected to the walking shoe.

11. In walking equipment for dragline excavators and the like, the combination comprising: a horizontal, rotatable drive shaft transverse to the desired line of movement of the machine to be walked; a generally circular driving disc eccentrically mounted on and rotatable with the shaft with its axis generally parallel to the axis of the shaft; a walking frame defining a generally circular bearing which rotatably receives the disc with a relatively close fit, said frame including a lower portion below the disc which is connected to the remainder of the frame by a hinge connection which allows the lower portion to pivot in a plane generally parallel to the axis of the shaft, said lower frame portion having laterally extending horizontal flanges to define at its bottom surface an elongated slide parallel to the line of movement of the machine; and elongated walking shoe that is generally parallel to and below the slide with a forward end pointing in the direction of movement of the machine, said walking shoe being provided on its upper surface on opposite sides of its center with two sets of facing angle members which overhang the slide to mount the walking shoe thereon, the walking shoe being slidable with respect to the frame forwardly and rearwardly along a line parallel to the line of movement of the machine, both sets of angle members converging from the front of the shoe toward the rear to center the walking shoe as it moves forwardly with respect to the frame, there being substantial clearance between the slide and angle members as the walking shoe moves rearward from its forwardmost position; and a link member having one of its ends connected by a universal joint to the walking shoe at a point to the rear of the disc and its other end connected by a universal joint to the disc at a point which is opposite the axis of the disc from the shaft and is located between a diameter through the shaft and a point which, when the shaft is level with and to the rear of the axis of the disc, is in a straight line with the shaft and the point where the link is connected to the walking shoe.

12. In walking equipment for dragline excavators and the like, the combination comprising: a generally circular, eccentrically rotatable driving disc; a walking frame having a generally circular bearing which rotatably receives the disc with a relatively close fit to mount the frame thereon; a walking shoe that is reciprocably slidably mounted on the frame by means of a tapered slideway connection so that the shoe is centered with respect to the frame at one end of its movement and is capable of increasing lateral angular movement as it slides toward the other end of its movement; a thrust bearing on the shoe and engageable with the frame to absorb lateral thrust; a mounting bracket for the thrust bearing, said bracket and bearing having mating, generally circular surfaces so that the bearing can pivot within the bracket to permit said lateral angular movement; and a link member pivotally connected at one end to the shoe and at its other end to the disc at a point generally opposite the center of the disc from the center of rotation of the disc.

References Cited by the Examiner

UNITED STATES PATENTS

| | | | |
|---|---|---|---|
| 1,591,764 | 7/1926 | Martinson | 180—8 |
| 1,627,984 | 5/1927 | Martinson | 180—8 |
| 2,247,782 | 7/1941 | Martinson et al. | 180—8 |
| 2,399,375 | 4/1946 | Mullins | 180—8 |
| 2,783,847 | 3/1957 | Martinson | 180—8 |

LEO FRIAGLIA, *Primary Examiner.*